June 17, 1941.                M. W. MARIEN                2,245,992
PISTON RING
Filed April 6, 1939
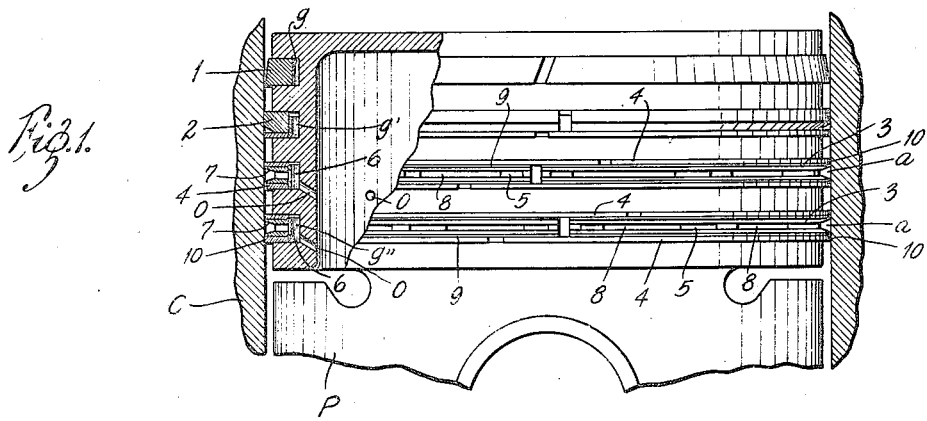
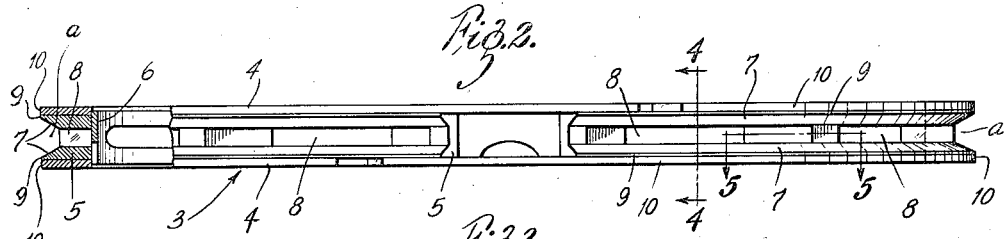
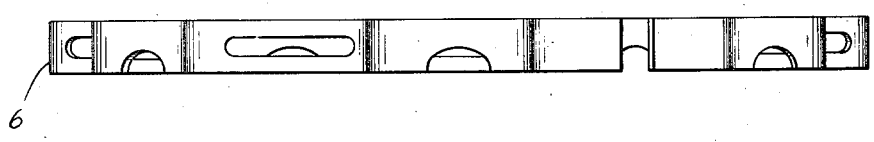
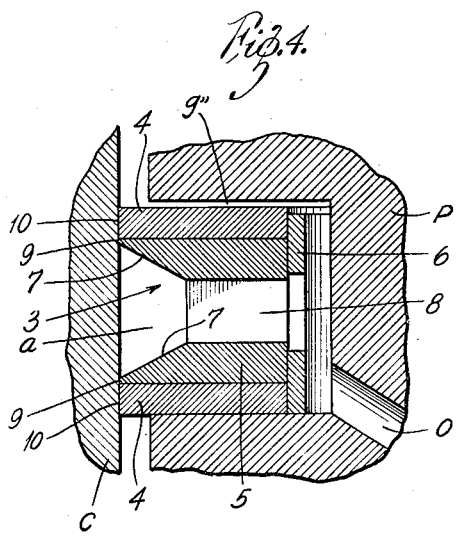
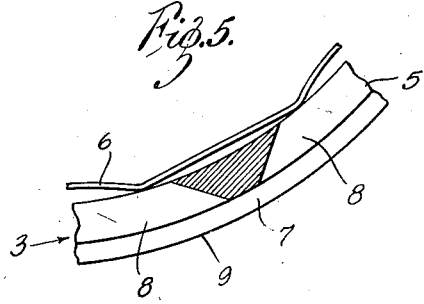
INVENTOR:
MELVIN W. MARIEN,
BY Harry A. Beimer
ATTORNEY.

Patented June 17, 1941

2,245,992

UNITED STATES PATENT OFFICE 2,245,992

PISTON RING

Melvin W. Marien, St. Louis, Mo., assignor to Ramsey Accessories Manufacturing Corporation, St. Louis, Mo., a corporation of Missouri Application April 6, 1939, Serial No. 266,266

1 Claim. (Cl. 309—45)

My invention has relation to improvements in piston packing rings and it consists in the novel features of construction more fully set forth in the specification and pointed out in the claim.

The invention is directed to that type of piston ring in which thin steel segments are combined with a cast iron segment which in the present instance serves not only as a spacer for the steel segments but also as a controlling element for the oil within the cylinder.

It is now generally recognized in the industry that thin steel ring elements or segments when properly combined with cast iron elements are very effective in controlling the oil on the cylinder wall. However, in some rings of this type now in use the control of the oil is carried to such an extreme that the cylinder walls are deprived of oil necessary for the lubrication thereof. It is one of the objects of the present invention to remove the excess of oil from the cylinder wall and at the same time allow sufficient oil to remain thereon for proper lubrication of the piston in its reciprocations.

The ring, in order to be effective, must also serve to hold the compression within the cylinder. My improved ring, embodying high unit pressure against the cylinder wall of both the steel elements and the cast iron element, is very effective in holding compression as well as controlling oil.

Another advantage of my improved ring is a tapered channel that leads into oil slots presenting no corners in which oil can stagnate and carbonize because there is a constant wash of oil over the channel walls which prevents such accumulation.

The ring also provides narrow cylinder contacting surfaces without introducing structural weaknesses into the ring so that it possesses ruggedness and long life.

Still another advantage is the bearing of the expander spring against the thin steel segments and the cast iron element with uniform pressure so that the comparatively thin edges of the steel segment will not break down the expander through excessive pressure thereon.

Other advantages will be better apparent from a detailed description of the invention in connection with the accompanying drawing, in which:

Figure 1 is a side elevation of the head end of a piston with parts broken away showing four piston ring grooves, the two upper grooves being equipped with compression rings and the two lower grooves being equipped with my improved oil rings; Fig. 2 is an enlarged side elevation of my improved oil ring with part broken away to show the cross-section of the ring; Fig. 3 is an enlarged side elevation of the inner ring or spring expander that serves to augment the inherent tension of the ring elements; Fig. 4 is a vertical cross-sectional detail taken on the line 4, 4 of Fig. 2 and considerably enlarged; and Fig. 5 is a horizontal longitudinal section through the ring taken on the line 5, 5 of Fig. 2.

Referring to the drawing, P represents a conventional piston operable within the cylinder C, said piston being provided with piston ring grooves $g$, $g'$, $g''$, $g''$, in the upper groove $g$ of which is disposed an ordinary one-piece piston ring 1, and in the second groove $g'$ is disposed a piston ring 2 of the improved compression type shown in the co-pending application of Charles A. Marien, Serial No. 266,251, and in the grooves $g''$, $g''$ are disposed my improved oil rings 3, 3, forming the subject-matter of the present invention and hereinafter described. No further reference will be made herein to the rings 1 and 2, although they cooperate most effectively when installed in a piston together with the ring 3 of the present improved construction.

The piston ring 3 embodies four separate elements combined in such a way as to function to the best advantage and each contributing, as will hereinafter be apparent, to the functions of the others. There are two thin steel segments 4, 4 serving primarily as oil scraper elements and maintained in spaced relation by a cast iron ring element 5 so that when the ring assembly is disposed in the piston ring groove $g''$ all of the elements will be in close juxtaposition with the thin steel elements immediately adjacent the sides of the groove $g''$. Each of the ring elements has its own inherent spring tension which is augmented by an inner ring or expander spring 6 of general polygonal shape similar to that shown in Patent No. 1,869,108 granted to Melvin W. Marien on July 26, 1932. The expander spring, as well understood in the art, is disposed in the groove $g''$ between the bottom of the groove and the ring elements 4, 4 and 5 and bears with substantially uniform pressure against both the ring elements 4, 4 and the ring element 5.

Since the expander bears with uniform pressure against both the thin steel elements and the cast iron element there will be little tendency for the thin steel elements 4, 4 to cut into the expander spring 6 and destroy the usefulness thereof. This defect commonly appears in ring combinations when the expander bears either only or principally against the thin steel segments.

The cast iron intermediate ring 5 is provided with an annular V-shaped channel a, the inclined side walls 7, 7 of which lead into elongated passageways 8 arranged in spaced relation entirely around the circumference of the ring 5. The channels a are of such width at the outer cylinder contacting face of the ring as to leave comparatively narrow cylinder contacting surfaces 9, 9 on the face of the ring. In fact, the cylinder contacting surfaces 9, 9 are of less width than the cylinder contacting surfaces 10, 10 of the thin steel segments 4, 4. The provision of cylinder contacting faces presenting so little surface to the cylinder wall insures a high unit pressure of the ring 5 against the cylinder wall to serve as an effective seal against loss of compression.

The small amount of metal of the cast iron element 5 that contacts with the cylinder wall will also insure that the ring will seat or "wear in" quickly against the cylinder wall. Furthermore, the uniform pressure of the expander against the cast iron ring 5 and the steel segments 4, 4 will serve to balance the wear between the steel segment and each cylinder contacting face 9. In other words, if one of said elements tends to wear more rapidly than the other there will immediately be an increase of spring pressure against the more slowly wearing element until the wear on this element equals the wear on the other element when the balance is restored.

Excess accumulations of oil within the oil passageways 8 will of course pass through the oil ports in the spring expander 6 and drain through the openings O back into the crankcase of the engine.

An inspection of Figure 4 will show that my improved ring is symmetrical and the pressures of the cylinder contacting surfaces 9, 9 and 10, 10 against the cylinder wall are balanced; therefore, neither of the thin steel segments 4, 4 at any time bears against the cylinder wall with excessive force such as to deprive the cylinder wall of the necessary amount of oil, and lubrication by the oil scraping action of the elements 4, 4 is shared equally between them. An excess of pressure of the elements 4, 4 against the cylinder wall is further guarded against by the cast iron ring 5 which takes some of the pressure of the expander 6 at points adjacent to both of the thin segments 4, 4 for transmission through the ring to the cylinder contacting surfaces 9, 9. Thus the cumulative effect of the plurality of cylinder contacting surfaces 10, 10 and 9, 9 is effective in controlling the oil on the cylinder wall and holding the compression within the cylinder without being unduly severe so as to deprive the cylinder of its proper lubrication.

Having described my invention, I claim:

A piston ring assembly comprising a split ring member having an outwardly presented channel extending substantially entirely around the periphery of the ring, said channel having outwardly diverging side walls and oil passageways in the bottom of the channel, thin cylinder contacting surfaces at the outer margins of the channel, cylinder contacting split ring elements contiguous to said marginal surfaces, the axial width of said marginal surfaces being less than that of the ring elements, and an expander within the ring assembly and contacting both the ring member and the ring elements.

MELVIN W. MARIEN.